UNITED STATES PATENT OFFICE.

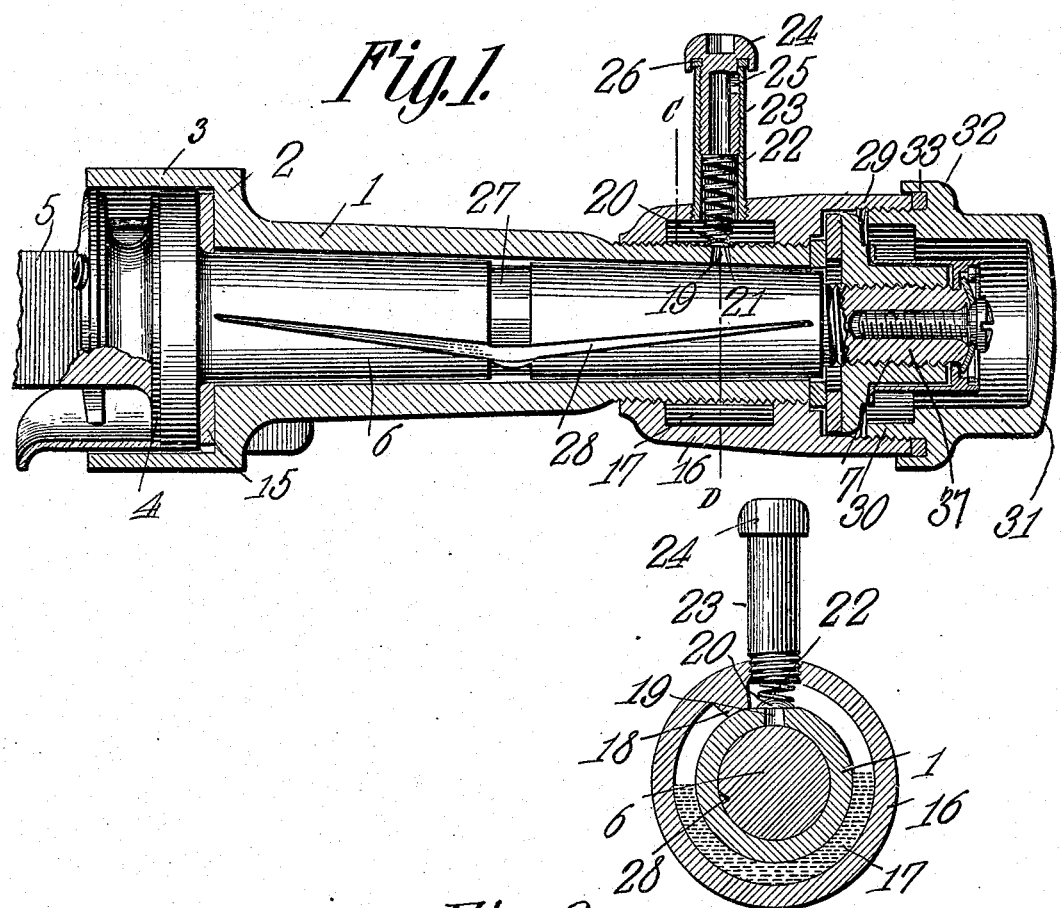

JAMES NELSON RICKARDS, OF RIDGELY, MARYLAND.

LUBRICATOR FOR AXLES.

936,740.   Specification of Letters Patent.   Patented Oct. 12, 1909.

Application filed May 6, 1908. Serial No. 431,216.

*To all whom it may concern:*

Be it known that I, JAMES NELSON RICKARDS, a citizen of the United States, residing at Ridgely, in the county of Caroline and State of Maryland, have invented a new and useful Lubricator for Axles, of which the following is a specification.

This invention relates to lubricators for axles and its object is to provide simple and efficient means for supplying a lubricant between the axle and the hub box, that portion of the axle within the box being constructed to direct into a receiving channel any grit which may accumulate within the box.

With the above and other objects in view the invention consists of certain novel features of construction and combinations of parts which will be hereinafter more fully described and pointed out in the claim.

In the accompanying drawings is shown the preferred form of the invention.

In said drawings—Figure 1 is a longitudinal section through the parts constituting the present invention, the axle being shown in elevation. Fig. 2 is a section on line C—D, Fig. 1.

Referring to the figures by characters of reference, 1 designates a tapered box of the usual or any preferred construction and having at its large end an enlargement 2 provided with an annular flange 3 constituting a dust cap. This cap is designed to surround a collar 4 formed upon the axle 5 at the inner end of the axle spindle 6, which spindle is mounted as usual within the box 1 and has a screw threaded extension 7 at its small end for engagement by an axle-nut 37. If desired, a washer 15 of any suitable material may be interposed between collar 4 and the enlargement 2, said washer constituting a removable wear device.

The outer or small end portion of the box 1 is screw-threaded exteriorly and is detachably engaged by a sleeve 16 having an annular compartment 17 therein and surrounding the inclosed portion of the box 1. This compartment is intersected by a partition or web 18 constituting a conveyer for a lubricant contained within the compartment. An opening 19 is formed in the top portion of the box and communicates with the middle portion of this compartment, and when a thin lubricant is employed this opening 19 is preferably partly closed by a disk 20 having a minute opening 21 therein. The disk is held seated upon the box 1 and around the opening 19 by means of a spring 22 extending into a tube 23 which is screwed into the sleeve 16. A screw plug 24 projects into this tube and against the spring 22 so as to hold said spring under stress. This plug is tubular for the greater portion of its length and has an inlet opening 25 designed to be exposed beyond the tube 23 when the plug is unscrewed a predetermined distance. When the plug is thus unscrewed, a lubricant can be supplied to the annular compartment 17, and by screwing the plug inward the opening 25 can be closed. It will be noticed that the head of the screw plug has a washer 26 designed to bear against plug 23 so as to seal it. It is of course to be understood that where a thick lubricant is employed cap 20 and spring 22 can be dispensed with. An annular channel 27 is formed within the central portion of spindle 6 and formed within one side portion of the spindle are downwardly-converging grooves 28 opening into the channel 27.

Sleeve 16 has an interiorly screw-threaded annular flange 29 extending beyond one end of the box 1 and which may be engaged by the threaded portion 30 of a screw cap 31. This screw cap is hollow so as to receive the extension 7 and the nut thereon, and has an annular flange 32 grooved as at 33 to receive the edge of flange 29, as shown in Fig. 1.

When the box 1 rotates upon the spindle the lubricant contained within the lower portion of compartment 17 will be carried upwardly by the conveyer 18 so that a portion of it will be free to flow through opening 19 and onto the spindle. Should any grit become positioned between the spindle and the box it will become seated ultimately within the converging grooves 28 and thus directed to the annular channel 27.

What is claimed is:—

The combination with a spindle and a box mounted for rotation thereon and having an aperture; of a sleeve threaded upon and removable from one end portion of the box and having an interior annular compartment communicating with the aperture, an inlet tube extending from and opening into the compartment, said tube being interiorly screw-threaded, a screw plug having a tubular portion engaging the interior threads of the tube, there being a head upon the plug for bearing against and receiving the end of the tube, the tubular portion of the plug having an aperture normally closed by the inlet tube, a valve within the annular compartment and normally bearing upon the box to close the aperture therein, and a spring bearing upon the valve and against the plug to hold the valve normally seated.

In testimony that I claim the foregoing as my own, I have hereto affixed my signature in the presence of two witnesses.

JAMES NELSON RICKARDS.

Witnesses:
JAMES M. WACKER,
FRANK S. APPLEMAN.